United States Patent
Raemy et al.

(10) Patent No.: US 8,768,935 B2
(45) Date of Patent: Jul. 1, 2014

(54) BIGRAM SUGGESTIONS

(75) Inventors: Vincent Raemy, Givisiez (CH); Vincenzo Russo, Bern (CH)

(73) Assignee: Verisign, Inc., Reston, VA (US)

( * ) Notice: Subject to any disclaimer, the term of this patent is extended or adjusted under 35 U.S.C. 154(b) by 207 days.

(21) Appl. No.: 13/269,950

(22) Filed: Oct. 10, 2011

(65) Prior Publication Data

US 2013/0091143 A1  Apr. 11, 2013

(51) Int. Cl.
*G06F 17/30* (2006.01)

(52) U.S. Cl.
USPC .......................................... 707/748; 707/754

(58) Field of Classification Search
CPC .......... G06F 17/3064; G06F 17/30646; G06F 17/30693
USPC ......................................................... 707/748
See application file for complete search history.

(56) References Cited

U.S. PATENT DOCUMENTS

| | | | |
|---|---|---|---|
| 5,857,179 A | 1/1999 | Vaithyanathan et al. | |
| 6,052,682 A | 4/2000 | Miller et al. | |
| 7,519,590 B2 | 4/2009 | Chandrasekar et al. | |
| 8,000,504 B2 | 8/2011 | Fan et al. | |
| 8,005,782 B2 | 8/2011 | Reznik et al. | |
| 2005/0004915 A1* | 1/2005 | Hermand ........................ | 707/10 |
| 2005/0210383 A1* | 9/2005 | Cucerzan et al. ............. | 715/533 |
| 2007/0174872 A1 | 7/2007 | Jing et al. | |
| 2008/0313145 A1* | 12/2008 | Telesco ............................. | 707/3 |
| 2009/0282039 A1 | 11/2009 | Diamond | |
| 2010/0023514 A1 | 1/2010 | Parikh | |
| 2010/0169492 A1* | 7/2010 | Lee ................................ | 709/226 |
| 2011/0208800 A1* | 8/2011 | Nicks ............................ | 709/203 |
| 2012/0084281 A1* | 4/2012 | Colosi ........................... | 707/723 |

OTHER PUBLICATIONS

Jianping Zhang et al., "The Role of URLs in Objectionable Web Content Categorization", Proceedings of the 2006 IEEE, 7 pages.
Extended European Search Report dated Jun. 7, 2013, European Application No. 12188061.1, filed Oct. 10, 2012, pp. 1-5, published by the European Patent Office.

* cited by examiner

*Primary Examiner* — Vincent F Boccio
*Assistant Examiner* — Amanda Willis
(74) *Attorney, Agent, or Firm* — MH2 Technology Law Group, LLP

(57) ABSTRACT

A method for generating a bigram database may include receiving domain names, tokenizing the domain names, generating token bigrams from the tokenized domain names, filtering the token bigrams, ranking the token bigrams, and storing the filtered and ranked token bigrams in a bigram database. A method for suggesting alternative domain names may include receiving a requested domain name, tokenizing the requested domain name to divide the requested domain name into a series of tokens, retrieving token bigrams for tokens of the requested domain name, generating alternative domain name suggestions based on the token bigrams and the requested domain name, ranking the alternative domain name suggestions, and outputting at least one of the alternative domain name suggestions.

20 Claims, 5 Drawing Sheets

BIGRAM SUGGESTIONS

This disclosure is directed to methods, systems, and non-transitory computer-readable storage media storing programs for creating a database of bigrams and suggesting alternative domain names based on a bigram database.

BACKGROUND

A good domain name is an important part of a web presence for individuals and businesses. Unfortunately, when attempting to register a domain name, the first choice for the domain name is not always available to the individual or business. When the first choice is not available, alternative domain names based on the initially requested domain name may be suggested.

However, many programs for suggesting alternative domain names do not suggest particularly relevant domain name alternatives, or, even if the suggestions are relevant, the most relevant alternative domain names may not be suggested towards the top of the list. Further, if the number of alternatives is limited, the most relevant alternative domain names may not actually even be suggested.

Accordingly, it is an object of embodiments of the disclosure to improve the relevance and quality of alternative domain name suggestions. Embodiments of the disclosure may achieve this object by using bigrams in the suggestion of alternative domain names.

Traditionally, a bigram database may be created using books, articles, or other literature, some of which may be available on the web. However, this source data may not be ideal for bigram suggestion for domain names, because domain names may be typically short and marketing oriented.

Thus, it is another object of embodiments of the disclosure to create a database of bigrams from a set of existing domain names and previously registered domain names. Other objects and advantages of embodiments of the disclosure may be apparent in view the description of exemplary embodiments below.

SUMMARY

In accordance with an embodiment, a computer-implemented method for generating a bigram database may be provided, the method including: (1) receiving a plurality of domain names; (2) tokenizing the plurality of domain names; (3) generating a plurality of token bigrams from the tokenized domain names; (4) filtering the plurality of token bigrams; (5) ranking the plurality of token bigrams; and (6) storing the filtered and ranked token bigrams in a bigram database. In the embodiment, the method steps may be performed by a processor, and the filtered and ranked token bigrams may be stored in a memory.

In the embodiment, the plurality of domain names may be received from a database, and the database may include a list of currently registered domain names. The database may also or alternatively include a list of previously registered domain names.

In the embodiment, the tokenizing may include: (1) dividing each domain name of the plurality of domain names into tokens, the tokens being sets of consecutive strings of characters; and (2) limiting the tokens to character strings that form words.

In the embodiment, the filtering may include one or more of: (1) filtering the plurality of token bigrams by length; (2) filtering the plurality of token bigrams by frequency of occurrence; or (3) filtering the plurality of token bigrams by token type.

In the embodiment, the ranking may include: (1) ordering the plurality of token bigrams based on a frequency of occurrence of the token bigrams; and (2) weighting or valuing the plurality of token bigrams based on the order of the plurality of token bigrams.

Another embodiment of the disclosure may include a computer-implemented method for suggesting alternative domain names, the method including: (1) receiving a requested domain name; (2) tokenizing the requested domain name to divide the requested domain name into a series of tokens; (3) retrieving token bigrams for tokens of the requested domain name; (4) generating at least one alternative domain name suggestion based on the token bigrams and the requested domain name; and (5) outputting at least one of the at least one alternative domain name suggestion. In the embodiment, the method steps may be performed by a processor.

In the embodiment, generating at least one alternative domain name suggestion may include, for at least one token in the tokenized requested domain name, generating an alternative domain name suggestion by replacing the token with a corresponding token bigram.

In the embodiment, generating the at least one alternative domain name suggestion may include generating a plurality of alternative domain name suggestions. The embodiment may further include ranking the plurality of alternative domain name suggestions based on weights of the token bigrams replacing the tokens in the tokenized requested domain name.

In the embodiment, the ranking step may further include ranking alternative domain name suggestions that include either (1) a backward bigram replacing a token at the beginning of the domain name or (2) a forward bigram replacing a token at the end of the domain name higher than other alternative domain name suggestions.

The embodiment may further include: (1) verifying the availability of the domain name of each of the plurality of alternative domain name suggestions before outputting the plurality of alternative domain name suggestion; and (2) for each of the plurality of alternative domain name suggestions, if the domain name is not available, removing the domain name from the alternative domain name suggestions.

In the embodiment, the token bigrams may be retrieved from a bigram database generated by: (1) receiving a plurality of domain names from a domain name database; (2) tokenizing, by a processor, the plurality of domain names; (3) generating, by the processor, a plurality of token bigrams from the tokenized domain names; (4) filtering, by the processor, the plurality of token bigrams; (5) ranking, by the processor, the plurality of token bigrams; and (6) storing, in a memory, the filtered and ranked token bigrams in the bigram database.

In the embodiment, the requested domain name may be added to the domain name database for future use.

Another embodiment of the disclosure may include a system for suggesting alternative domain names. The system may include: (1) a processor; and (2) a memory connected to the processor. The memory may store instructions to direct the processor to perform operations, the operations including: (1) receiving a requested domain name; (2) tokenizing the requested domain name to divide the requested domain name into a series of tokens; (3) retrieving token bigrams for tokens of the requested domain name; (4) generating at least one alternative domain name suggestion based on the token bigrams and the requested domain name; and (5) outputting at least one of the at least one alternative domain name suggestion.

In the embodiment, the system may further include: (1) a user terminal, where the requested domain name may be received from the user terminal; and (2) a display that outputs the at least one of the at least one alternative domain name suggestion.

In the embodiment, the generating at least one alternative domain name suggestion may include: for at least one token in the tokenized requested domain name, generating an alternative domain name suggestion by replacing the token with a corresponding token bigram; and generating a plurality of alternative domain name suggestions. The operations of the processor may further include ranking the plurality of alternative domain name suggestions based on weights of the token bigrams replacing the tokens in the tokenized requested domain name.

In the embodiment, the token bigrams may be retrieved from a bigram database generated by: (1) receiving a plurality of domain names from a domain name database; (2) tokenizing the plurality of domain names; (3) generating a plurality of token bigrams from the tokenized domain names; (4) filtering the plurality of token bigrams; (5) ranking the plurality of token bigrams; and (6) storing the filtered and ranked token bigrams in the bigram database.

Another embodiment of the disclosure may include a non-transitory computer-readable storage medium storing instructions for suggesting alternative domain names. The instructions may cause one or more computer processors to perform operations according to a method. The method may include: (1) receiving a requested domain name; (2) tokenizing the requested domain name to divide the requested domain name into a series of tokens; (3) retrieving token bigrams for tokens of the requested domain name; (4) generating at least one alternative domain name suggestion based on the token bigrams and the requested domain name; and (5) outputting at least one of the at least one alternative domain name suggestion.

In the embodiment, the generating at least one alternative domain name suggestion may include: (1) for at least one token in the tokenized requested domain name, generating an alternative domain name suggestion by replacing the token with a corresponding token bigram; and (2) generating a plurality of alternative domain name suggestions. The embodiment may also include ranking the plurality of alternative domain name suggestions based on weights of the token bigrams replacing the tokens in the tokenized requested domain name.

In the embodiment, the token bigrams may be retrieved from a bigram database generated by: (1) receiving a plurality of domain names from a domain name database; (2) tokenizing the plurality of domain names; (3) generating a plurality of token bigrams from the tokenized domain names; (4) filtering the plurality of token bigrams; (5) ranking the plurality of token bigrams; and (6) storing the filtered and ranked token bigrams in the bigram database.

Additional objects and advantages of the invention will be set forth in part in the description which follows, and in part will be obvious from the description, or may be learned by practice of the embodiments of the disclosure. The objects and advantages of the embodiments will be realized and attained by means of the elements and combinations particularly pointed out in the appended claims.

It is to be understood that both the foregoing general description and the following detailed description are exemplary and explanatory only and are not restrictive of the embodiments, as claimed.

The accompanying drawings, which are incorporated in and constitute a part of this specification, illustrate embodiments of the invention and together with the description, serve to explain the principles of the embodiments of the disclosure.

DESCRIPTION OF EXEMPLARY EMBODIMENTS

Reference will now be made in detail to the present exemplary embodiments of the disclosure, examples of which are illustrated in the accompanying drawings. Wherever possible, the same or similar reference numbers will be used throughout the drawings to refer to the same or like parts.

Figure 1:
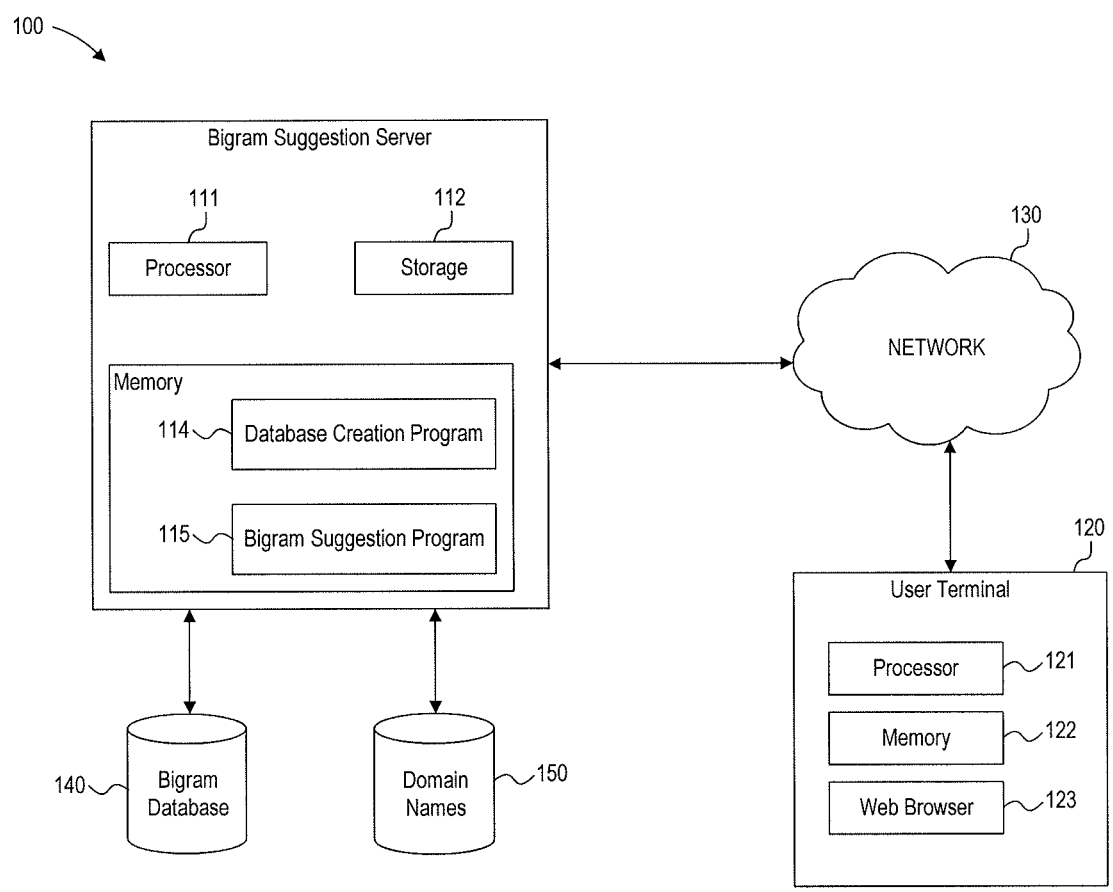
FIG. 1 is diagram illustrating an exemplary system 100 for creating a bigram database and/or suggesting alternative domain names based on a bigram database.

FIG. 1 is diagram illustrating an exemplary system 100 for creating a bigram database and/or suggesting alternative domain names based on a bigram database. The exemplary system 100 includes exemplary system components that may be used. The components and arrangement, however, may be varied.

A bigram suggestion server 110 may include a processor 111, storage 112, a memory 113, and input/output (I/O) devices (not shown). The bigram suggestion server 110 may be implemented in various ways. For example, the bigram suggestion server 110 may be a general purpose computer, a server, a mainframe computer, or any combination of these components. The bigram suggestion server may be standalone, or it may be part of a subsystem, which may, in turn, be part of a larger system.

Although FIG. 1 illustrates the bigram suggestion server 110, the bigram database 140, and the domain name database 150 as separate components, the suggestion server 110 may alternatively be integrated with the bigram database 140 and/or the domain names database 150. Additionally, the bigram database 140 and the domain names database 150 may be integrated into a single database or stored in a same memory device.

The processor 111 may include one or more known processing devices, such as a microprocessor from the Pentium™ or Xeon™ family manufactured by Intel™, the Turion™ family manufactured by AMD™, or any of various processors manufactured by Sun Microsystems. Memory 113 may include one or more storage devices configured to store information used by processor 111 to perform certain functions related to disclosed embodiments. Storage 112 may include a volatile or non-volatile, magnetic, semiconductor, tape, optical, removable, non-removable, or other type of computer-readable medium used as a storage device.

In one embodiment, memory 113 may include one or more programs or subprograms that may be loaded from storage 112 or elsewhere that, when executed by pattern matching server 110, perform various procedures, operations, or processes consistent with disclosed embodiments. For example, memory 113 may include a database creation program 114 for creating a bigram database according to disclosed embodiments, and may also include a bigram suggestion program 115 for suggesting alternative domain names based on a bigram database according to disclosed embodiments. Memory 113 may also include other programs that perform other functions and processes, such as programs that provide communication support, Internet access, etc. Additionally, the database creation program 114 and bigram suggestion program 115 may be embodied in a single program, or alternatively, each may include multiple sub-programs that, when executed, operate together to perform the function of a database creation program or a bigram suggestion program according to disclosed embodiments.

The bigram suggestion server 110 may communicate over a link with a network 130. For example, the link may be a direct communication link, a LAN, a WAN, or other suitable connection. The network 130 may include the internet.

The bigram suggestion server 110 may include one or more I/O devices (not shown) that allow data to be received and/or transmitted by the bigram suggestion server 110. I/O devices may also include one or more digital and/or analog communication input/output devices that allow the bigram suggestion server 110 to communicate with other machines and devices, such as a user terminal 120. The bigram suggestion server 110 may receive data from external machines and devices and output data to external machines and devices via I/O devices, such as the user terminal 120. The configuration and number of input and/or output devices incorporated in I/O devices may vary as appropriate for certain embodiments.

The bigram suggestion server 110 may also be communicatively connected to one or more data repositories, for example, a bigram database 140 and/or a domain name database 150. Alternatively, the bigram database 140 and the domain name database 150 may be implemented in a single database.

The bigram suggestion server 110 may also be communicatively connected to one or more user terminals 120 through network 130. User terminal 120 may include a processor 121, a memory 122, and a web browser 123 to communicate with the bigram suggestion server 110. The bigram suggestion server 110 may send data to processor 121 and web browser 123, and web browser 123 may display the data as a bigram database or as domain name suggestions. In some embodiments, the bigram suggestion server 110 may render an interface requesting user input or outputting results to a user and send the interface to web browser 123 for display. In other embodiments, the bigram suggestion server 110 may send data used to create the interface to the user terminal 120 and the user terminal 120 may render the interface.

The user terminal 120 may send data to the bigram suggestion server 110 representing a domain name that a user desires to register. The user terminal 120 may include I/O devices (not shown) to enable communication with a user. For example, the I/O devices may include one or more input devices, such as a keyboard, touch screen, mouse, and the like, that enable the user terminal 120 to receive data from a user. Further, the user terminal 120 may include I/O devices that communicate with one or more output devices, such as a display screen, CRT monitor, LCD monitor, plasma display, printer, speaker devices, and the like, that enable the user terminal 120 to present data to a user.

An exemplary use of the system 100 will now be described by way of example with reference to the method illustrated in FIG. 2

Figure 2:
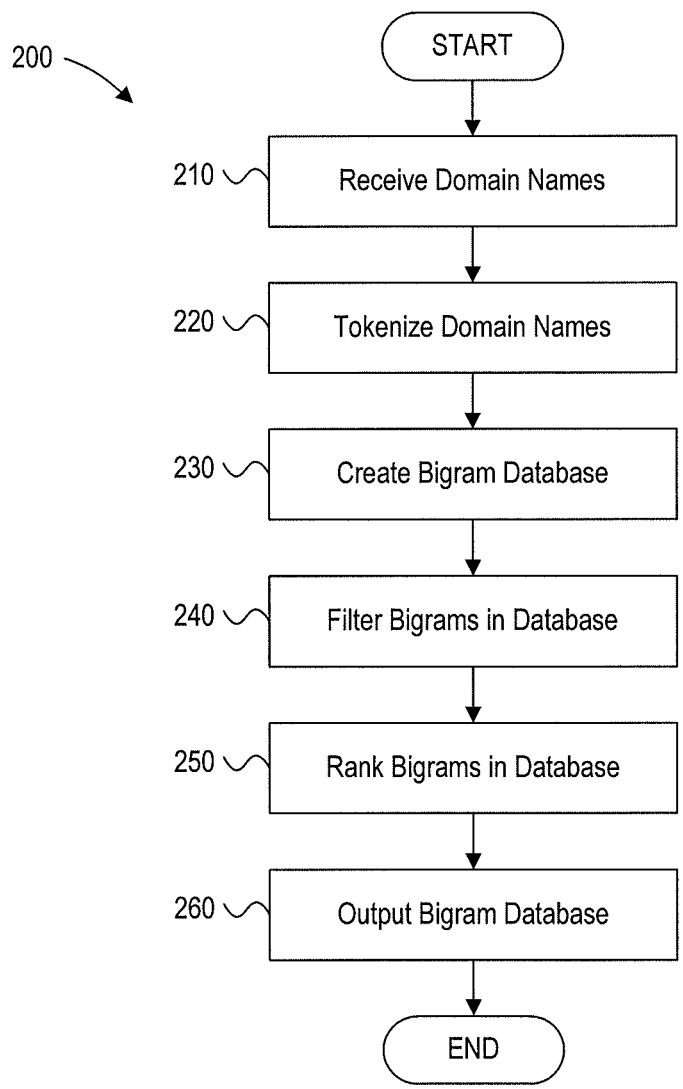
FIG. 2 is an exemplary illustration of a method for creating a database of bigrams.

FIG. 2 is an illustration of an exemplary method 200 for creating a database of bigrams. The exemplary method 200 illustrated in FIG. 2 can be carried out, for example, using the system 100 illustrated in FIG. 1, described above. Accordingly, the following description of the method 200 for creating a database of bigrams refers to the components of the system 100 illustrated in FIG. 1. However, the method could be performed by other components or arrangements of components not specifically illustrated in FIG. 1

In step 210, the bigram suggestion server 110 may obtain domain names from a domain name database 150 or other source of domain names. While in this exemplary method, the bigram suggestion server 110 is described as carrying out certain steps, the processor 111, other components of the bigram suggestion server 110, or other known components not specifically illustrated could be used to perform the method steps. The bigram suggestion server 110 may be a personal computer, a server, an application specific integrated circuit (ASIC), a field programmable gate array (FPGA), etc. The domain name database 150 may include a listing of currently registered domain names and may also include a listing of previously registered domain names or domain names that were requested but never registered. In one embodiment, the domain names may be limited to specific top level domains, such as .com or .net, or may include all domain names within all top level domains. The domain names may be obtained from domain name registries or other sources of registered domain names or previously registered domain names.

In step 220, the bigram suggestion server 110 may tokenize the domain names received from the domain name database 150 or other source of domain names. Tokenizing the domain names may include dividing the domain names into sets of strings of characters, or tokens. The top level domain (.com, .net, etc) may be excluded when tokenizing the domain name. The tokens may be limited to character strings that form words or other useful identifiers. For example, a domain name "soccersportsteam.com", may be tokenized in one instance as "soccer-sports-team". Each of the strings "soccer," "sports," and "team" are tokens. It should be noted that a domain name may be tokenized in more than one way. For example, the string "sportsteam" could be tokenized into both "sports-team" and "sport-steam." The tokenized domain names may be stored for future processing, for example, on the bigram suggestion server 110 or other storage devices. Other known methods of tokenizing may be used by the bigram suggestion server 110 to tokenize the domain names.

In step 230, the bigram suggestion server 110 may create a bigram database 140 from the tokenized domain names. A bigram is a pair of tokens that appear adjacent each other in a domain name. For example, using the "soccersportsteam.com" example above, "soccer" and "sports" form a token bigram, and "sports" and "team" form another token bigram. That is, bigrams of the token "sports" include "sports-team" and "soccer-sports." Each of the bigrams "sports-team" and "soccer-sports" would be entered into the bigram database 140. The bigram suggestion server 110 may use all of the tokenized domain names to create the bigram database 140, or may use only a subset of the tokenized domain names.

To create the bigram database 140, the bigram suggestion server 110 may create an entry for each bigram that occurs in the tokenized domain names. The bigram database 140 may also include a counter for each bigram, and the bigram suggestion server 110 may increment the counter for a bigram for each occurrence of the specific bigram. Thus, the bigram database 140 may include a list of bigrams occurring in the tokenized domain names, and a counter for each of the bigrams indicating the frequency of occurrence of the bigrams.

In step 240, the bigram suggestion server 110 may then filter the bigrams in the bigram database 140. The bigrams in the bigram database 140 may be filtered according to any criteria relating to the bigrams. For example, the bigrams may be filtered by length, so that any bigrams shorter than a specified length, or with tokens shorter than a specified length, are removed from the bigram database 140. In one embodiment, the threshold token length of the bigrams is two characters. In another embodiment, the threshold token length of the bigrams is three characters. However, any appropriate threshold may be set for filtering of the bigrams in the bigram database. In the embodiment where the threshold is set at three characters, any bigram that contains a token that is less than three characters (two or one character tokens) will be removed from the bigram database 140.

Removing short bigrams or bigrams with short tokens may be important because the number of short tokens may be large, and the informative value of short tokens may be limited. Specifically, the value of using bigrams may consist in the fact that the tokens of the bigram are related, and thus one token in the bigram may provide information about the other bigram in the token. Bigrams which are not related may be less informative than tokens with related words. In this sense, related words means words with similar meanings or words that are often used together, for example, sports and team, life and insurance, real and estate, etc. Shorter tokens, such as "of" or "to" may occur too frequently with too many other tokens, and thus may not provide any specific relational information about the other token in the bigram. Thus, such bigrams may be removed from the database to increase the informative value of the database.

Alternatively, or in addition to filtering the bigrams by length, the bigram suggestion server 110 may filter the bigrams in the bigram database 140 based on the frequency of occurrence of the bigrams. For example, the bigram suggestion server 110 may filter bigrams that do not occur frequently enough. In one embodiment, the threshold frequency may be set at fifty, and any bigrams that do not occur at least fifty times may be removed from the database. In other embodiments, the threshold may be set based on an empirical study of the bigrams in the bigram database 140 to limit the size of the database to an appropriate and/or manageable size for efficiency or other considerations. Filtering the bigrams by frequency of occurrence can reduce the size of the bigram database 140, which can increase computational efficiency. Additionally, infrequently occurring bigrams may be less likely to provide valuable predictive or suggestive information that more frequently occurring bigrams can, and thus removing infrequently occurring bigrams may result in a more useful or pertinent bigrams in the bigram database 140.

Alternatively, or in addition to the above-described filtering techniques, the bigram suggestion server 110 may filter the bigrams in the bigram database 140 based on specific token types within the bigrams. For example, bigrams that include a token that is a stop word may be removed from the bigram database 140. A stop word is a word that is so popular or generic that it becomes noise; that is, a stop word does not contain have any specific relationship to the other token in the bigram because the stop word occurs together with such a large number of other tokens in bigrams. An example of a stop word could be "and" or "the." Removing bigrams that include stop words as tokens may increase the relevance and suggestive importance of the remaining bigrams in the bigram database 140.

Another type of specific tokens within bigrams that may be used as a basis for filtering bigrams is localized tokens. Localized tokens can be too specific when used in bigrams, and it may be advantageous to remove bigrams from the bigram database 140 that include such localized tokens. Localized tokens may include, for example, words like "city," "river," "road," etc. Localized tokens, like other tokens, may appear in a bigram as either the first or the last token in the bigram. When the token appears first in the bigram, the bigram may be considered a forward bigram of that token. For example, the bigram "city center" is a forward bigram of the token "city." When the token appears last in the bigram, the bigram may be considered a backward bigram of that token. For example, the bigram "Atlantic city" is a backward bigram of the token "city." In one embodiment, backward bigrams of localized tokens may be removed from the bigram database 140, while forward bigrams of localized tokens may be retained in the bigram database 140. Specifically, it may be likely that a backward bigram of a localized token, for example, "city," is too specific to provide useful information for suggesting alternatives based on the bigram database 140. For example, a user looking for an alternative domain name that includes the word "city" is unlikely to be looking specifically for Atlantic City (backward bigram) or any other specific city, as these may be extremely narrow suggestions. However, a user looking for an alternative domain name that includes the word "city" may be more likely to respond favorably to a forward bigram of the word "city," such as "city center" or "city guide." Thus, in one embodiment, backward bigrams of localized tokens may be removed from the bigram database 140, while forward bigrams of localized tokens may be retained in the bigram database 140. In other embodiments, bigrams containing localized tokens may be flagged for review by a system administrator who may determine empirically whether to include the bigrams with localized tokens in the bigram database 140.

Although the above-described embodiments included filtering the bigram database 140 based on bigram length, frequency, and specific token types, in other embodiments the bigrams in the bigram database 140 may be filtered according to any other criteria relating to the bigrams.

Figure 3:
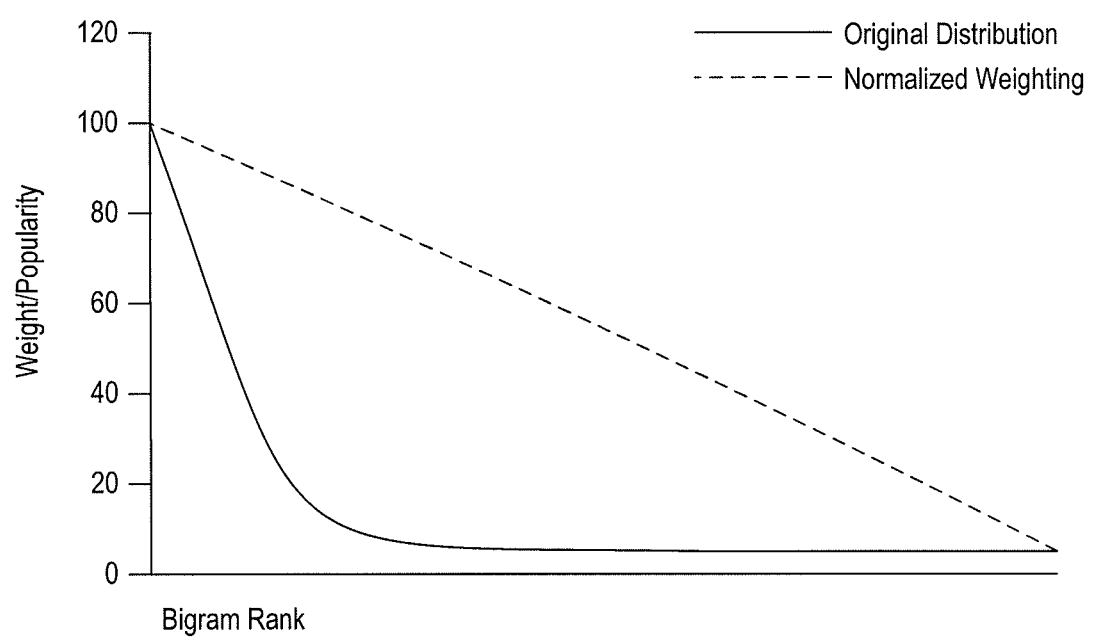
FIG. 3 is an exemplary graphical illustration of the distribution of bigrams and the ranking of bigrams.

In step 250, the bigram suggestion server 110 may then rank or order the bigrams within the bigram database 140. The bigrams may be ranked based on their frequency of occurrence or popularity. The ranking may additionally include a weighting step or function. The bigrams in the bigram database 140 may be initially weighted based on their popularity. However, due to the nature of bigrams, it may be likely that a very small number of bigrams occur with a high frequency, while a very large number of bigrams occur with a low frequency. In this case, the popular token bigrams may appear in suggestions very frequently, while the less popular bigrams may never appear in a suggestion. This is illustrated, for example, by the solid line "Original Distribution" in FIG. 3. In FIG. 3, the horizontal axis represents the bigram rank, with the most popular bigrams starting at the origin and less popular bigrams extending to the right of the origin. The vertical axis represents the weight or popularity of the bigrams. In this case, if the weight of a bigram is directly proportional to its popularity, the weight and popularity are the same.

However, in order to ensure that a more appropriate distribution of bigrams are included in suggestions, the initial weighting based on popularity may be normalized or linearized. This is illustrated, for example, by the dashed line "Normalized Weighting" in FIG. 3. In the normalizing or linearizing process, bigrams are given a weight based on their relative position within the ranking, rather than by their overall popularity. For example, if there are 100 bigrams in the database, even if the top 5 bigrams account for 95% of all occurrences of the bigrams, the top ranked bigram would receive a weight of 100, the next ranked bigram would receive a weight of 99, the next ranked bigram would receive a weight of 98, and so on, down to the lowest ranked bigram, which would receive a weight of 1. Although the weighting of the bigrams has been described with relation to a simple linear weighting distribution, other known weighting distributions could be used for the weighting of the bigrams.

Within the bigram database 140, the bigrams may be ranked and weighted, for example, as described above, either as a whole, or may be divided into sub-groups and ranked and weighted within the sub-groups. For example, the bigrams may be divided based on the tokens making up the bigrams. Then, all of the bigrams containing a specific token may be ranked and weighted with respect to each other.

In step 260, the bigrams in the bigram database 140 may be stored in the bigram database 140 in order by their rank and/or weight, and may then be output. For example, the bigram suggestion server 110 may upload the bigram database 140. Alternatively, or in addition to uploading the bigram database 140, the bigram suggestion server 110 may make the bigram database 140 available to the user terminal 120, which may display the bigram database 140 to a user.

Figure 4:
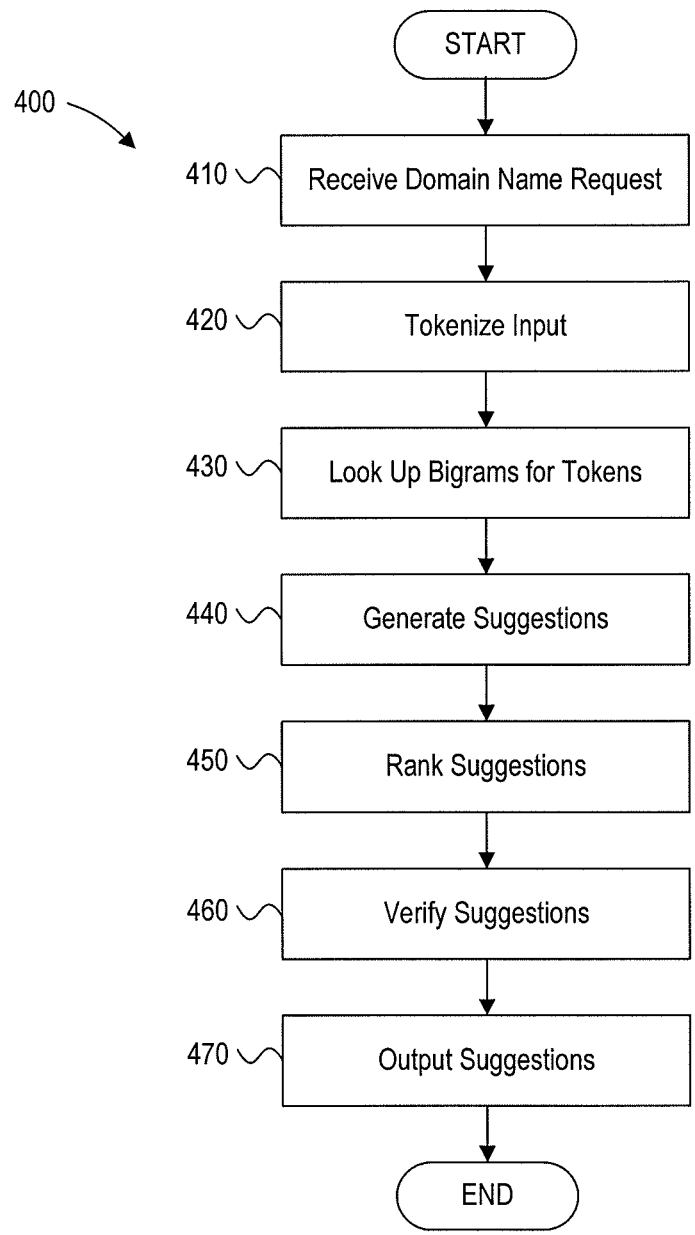
FIG. 4 is an exemplary illustration of a method for suggesting alternative domain names based on a bigram database.

FIG. 4 is an exemplary illustration of a method 400 for suggesting alternative domain names based on a bigram database. In step 410, the bigram suggestion server 110 receives a domain name request. The domain name request may come from a user at the user terminal 120, as an automatic request from a program, or from some other source, such as the network 130. The domain name request may include at least the name of the domain that the user or other is seeking to register. For example, a user may request to register the domain name "soccersportsteam.com", which could be sent to the bigram suggestion server 110 as the domain name request.

In step 420, the bigram suggestion server 110 may tokenize the input domain name request. The tokenizing of the domain name request may be similar to the tokenizing of domain names described above with respect to step 220 of FIG. 2. For example, the requested domain name "soccersportsteam.com" may be tokenized into the tokens "soccer", "sports" and "team". As discussed above, a domain name may be tokenized into several different sets of tokens. In this case, the domain name may also be tokenized into the tokens "soccer", "sport" and "steam". In one embodiment, a user may assist the tokenizing by the bigram suggestion server 110 by selecting between different sets of tokens. Alternatively, the user may assist the tokenizing by identifying tokens in the domain name either when making the request, or after the bigram suggestion server 110 notifies the user that there are multiple possible tokenizations of the requested domain name. In another embodiment, the bigram suggestion server 110 may automatically select the most likely tokenization of the requested domain name. In yet another embodiment, the bigram suggestion server 110 may perform the alternative domain name suggestion process for each or a subset of the multiple tokenizations of the requested domain name.

After tokenizing the requested domain name, the bigram suggestion server 110 may look up bigrams in the bigram database 140 for the tokens in step 430. For example, the bigram suggestion server 110 may look up bigrams for the tokens "soccer", "sports" and "team" in the above example. The bigrams for the tokens may be loaded from the bigram database 140 and stored temporarily in the bigram suggestion server 110, for example, in the storage 112 or in the memory 113.

After looking up bigrams of the tokens in the requested domain name, the bigram suggestion server 110 may generate a preliminary list of suggestions for alternative domain names in step 440. The alternative domain name suggestions are based on the requested domain name and the bigrams of the tokens in the requested domain name. For example, the bigram suggestion server 110 may replace a token in the requested domain name with a bigram of that token. In the above example, the bigram suggestion server 110 may replace "soccer" with a bigram of soccer, for example, "soccer-fan", to generate the suggested alternative domain name "soccerfansportsteam". In another embodiment, the bigram suggestion server 110 may replace multiple tokens with a bigram of one of the tokens. Using the "soccersportsteam" example, the bigram suggestion server 110 may replace "soccer" and "sports" with the bigram "soccer-fan" to create the suggestion "soccerfanteam".

In other embodiments, multiple tokens of the requested domain name may be replaced with respective bigrams. For example, "soccer" may be replaced with "soccer-fan" and "team" may be replaced with "team-building" to generate the suggestion "soccerfansportsteambuilding". In other embodiments, a combination of replacing tokens with bigrams and also replacing multiple tokens with a single bigram may be used to generate alternative domain name suggestions. For example, "soccersports" may be replaced with "soccer-fan" and "team" may be replaced with "team-building" to generate the suggestion "soccerfanteambuilding". In one embodiment, the method by which the bigram suggestion server 110 generates alternative domain name suggestions may be set by the user.

Because the possible alternative domain name suggestions may be nearly limitless, the bigram suggestion server 110 may limit the number of suggestions generated in step 440. Because the number of suggestions may be limited, when the bigram suggestion server 110 decides which bigrams to use in the process of generating suggestions, it may give preference to highly ranked or weighted bigrams in the bigram database 140.

In one embodiment, after generating the alternative domain name suggestions, the bigram suggestion server 110 may filter and remove any suggestions that may be offensive, obscene, or otherwise inappropriate. The decision whether to filter and remove suggestions may be automatically made by the bigram suggestion server 110, or may be based on a user preference.

In step 450, the suggestions generated in step 440 may be ranked. Ranking the alternative domain name suggestions may ensure that the most relevant suggestions appear at the top of the list of suggestions output by the bigram suggestion server 110. Additionally, because the bigram suggestion server 110 may limit the number of suggestions that are output, ranking the suggestions may ensure that the most relevant suggestions are output.

The alternative domain name suggestions may be ranked based on the rank or weight of the bigrams included in the suggestions. For example, the alternative domain name suggestion that includes the highest weighted bigram may be ranked the highest. Additionally, other ranking schemes may be used, and a combined ranking of the various schemes may be used to rank the suggestions. For example, a topical ranking scheme may be used to determine a ranking based on the uniformity of the topics within the tokens of the domain name suggestion, and the topical ranking may be added to the ranking generated by the bigram suggestion server 110 to determine a final ranking of the suggestion. Other known ranking schemes may be used in addition to the ranking provided by the bigram suggestion server 110. However, in one embodiment, only the ranking provided by the bigram suggestion server 110 is used to determine the rank of the alternative domain name suggestions.

In one embodiment, a positional factor may be applied to the ranking of the alternative domain name suggestions. The positional factor is based on the idea that bigrams applied at the extremes of the requested domain name may be more likely to be more relevant than bigrams applied in between tokens in the requested domain name. Thus, the bigram suggestion server 110 may rank alternative domain name suggestions that include either (1) a backward bigram replacing a token at the beginning of the domain name or (2) a forward bigram replacing a token at the end of the domain name higher than other alternative domain name suggestions without these features. In another embodiment, the positional factor may not necessarily rank the suggestions higher than all other suggestions, but may increase the rank of the suggestions with bigrams at the extremes by a certain number or multiplicative factor.

As an example, if the requested domain name is "soccerteam", the bigram suggestion server 110 may generate "soccer-team-sports" from a bigram of "team", "youth-soccer-team" from a bigram of "soccer", and "soccer-horse-team" from another bigram of "team". In this example, the alternative domain name suggestions that include either (1) a backward bigram replacing a token at the beginning of the domain name or (2) a forward bigram replacing a token at the end of the domain name are more likely relevant to a user seeking to register "soccerteam". Thus, in one embodiment, regardless of any previous ranking, "soccer-team-sports" and "youth-soccer-team" may be ranked higher than "soccer-horse-team" based on the position of the bigrams within the suggestions.

In one embodiment, all of the ranking methods described above may be used. In another embodiment, only one of the ranking methods described above may be used. In yet another embodiment, a combination of some of the above described ranking methods may be used in step 450.

In step 460, the bigram suggestion server 110 may verify the alternative domain name suggestions. Specifically, before outputting the suggestions, the bigram suggestion server 110 may verify that the alternative domain names are available for registration. If an alternative domain name is not available, the bigram suggestion server 110 may remove that domain name from the list of suggestions. Alternatively, the bigram suggestion server 110 may flag the unavailable domain name to alert the user that the domain name, while included in the list of alternative domain names, is not available for registration at this time.

In step 470, the alternative domain name suggestions are output by the bigram suggestion server 110. The suggestions may be output by the bigram suggestion server 110 based on their rank. The bigram suggestion server 110 may output a specific predetermined number of suggestions or a number input by the user. The bigram suggestion server 110 may output the suggestions to the user terminal 120, which may then interpret and present the suggestions to the user in any appropriate audio or visual format.

In one embodiment, the user may be given the option to select one of the alternative domain name suggestions for registration. If the user selects one of the alternative domain name suggestions for registration, the bigram suggestion server 110 may begin the registration process.

Regardless whether the user selects an alternative domain name suggestion for registration, in one embodiment, the bigram suggestion server 110 may update the bigram database and/or the domain name database to include the requested domain name. In another embodiment, the bigram suggestion server 110 may track recent domain name requests to determine whether specific tokens or bigrams are currently trending. If specific tokens or bigrams are currently trending, the bigram suggestion server 110 may incorporate this fact into the ranking process described in step 450.

Figure 5:
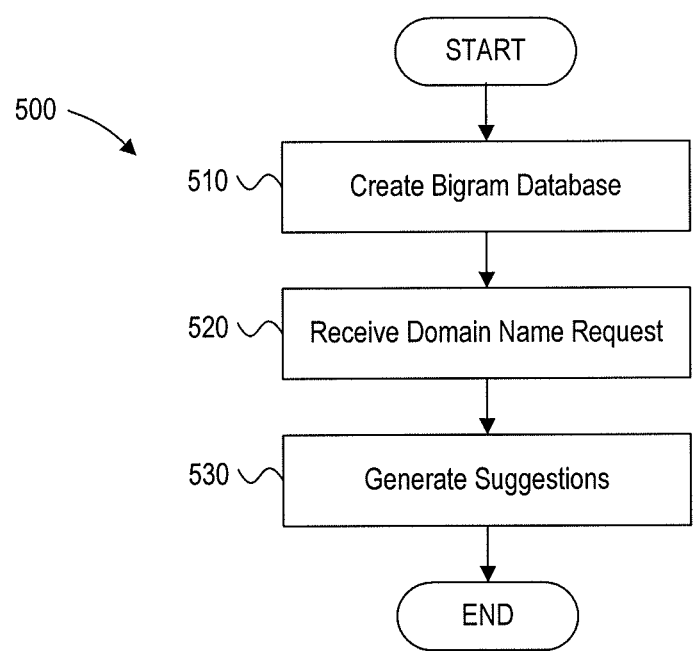
FIG. 5 is an exemplary illustration of a method for creating a database of bigrams and suggesting alternative domain names based on the bigram database.

FIG. 5 is an exemplary illustration of a method 500 for creating a database of bigrams and suggesting alternative domain names based on the bigram database. In step 510, a bigram database may be created. The creation of the bigram database may be performed by a method similar to the method described above with respect to FIG. 2. In step 520, the bigram suggestion server 110 may receive a domain name request. The domain name request may come from a user at the user terminal 120, as an automatic request from a program, or from some other source, such as the network 130. As discussed above, the domain name request may include at least the name of the domain that the user or other is seeking to register. In one embodiment, step 520 may occur prior to step 510. In step 530, the bigram suggestion server 110 may generate alternative domain name suggestions. The generation of alternative domain names may be performed by a method similar to the method described above with respect to FIG. 4.

Although the examples used in this description contained only two or three tokens in the requested domain name, the requested domain names may include a single token, or several tokens, and the embodiments are not limited to a specific number of tokens in the requested domain name, unless otherwise indicated.

Additionally, although the above systems and methods have been described with respect to generating alternative domain name suggestions, the systems and methods may be applied to other suggestion methods without deviating from the spirit and scope of the embodiments of the disclosure. For example, the above-described systems and methods could be used to suggest alternative email addresses, online usernames, gamertags, etc.

Other embodiments of the invention will be apparent to those skilled in the art from consideration of the specification and practice of the invention disclosed herein. In particular, non-dependent steps may be performed in any order, or in parallel. It is intended that the specification and examples be considered as exemplary only, with a true scope and spirit of the invention being indicated by the following claims.

What is claimed is:

1. A computer-implemented method for generating a bigram database, the method comprising:
   receiving a plurality of domain names;
   tokenizing, by a processor, the plurality of domain names;
   generating, by the processor, a plurality of token bigrams from the tokenized domain names;
   filtering, by the processor, the plurality of token bigrams by token type, wherein the token type includes at least one of: (1) a forward bigram which replaces a token at the end of a tokenized domain name or (2) a backward bigram which replaces a token at the beginning of a tokenized domain name;
   ranking, by the processor, the plurality of token bigrams, wherein forward bigrams are ranked higher than other token bigrams of the plurality of token bigrams; and storing, in a memory, the filtered and ranked token bigrams in a bigram database.

2. The method according to claim 1, wherein the plurality of domain names are received from a database, the database including a list of currently registered domain names.

3. The method according to claim 2, wherein the database further includes a list of previously registered domain names.

4. The method according to claim 1, wherein the tokenizing comprises:
dividing each domain name of the plurality of domain names into tokens, the tokens being sets of consecutive strings of characters;
limiting the tokens to character strings that form words.

5. The method according to claim 1, wherein the filtering comprises at least one of:
(1) filtering the plurality of token bigrams by length; or (2) filtering the plurality of token bigrams by frequency of occurrence.

6. The method according to claim 1, wherein the ranking comprises:
ordering the plurality of token bigrams based on a frequency of occurrence of the token bigrams; and
weighting the plurality of token bigrams based on the order of the plurality of token bigrams.

7. A computer-implemented method for suggesting alternative domain names, the method comprising:
receiving a requested domain name;
tokenizing, by a processor, the requested domain name to divide the requested domain name into a series of tokens;
retrieving, by the processor, token bigrams for tokens of the requested domain name;
generating, by the processor, a plurality of alternative domain name suggestions based on the token bigrams and the requested domain name;
ranking the plurality of alternative domain name suggestions, wherein the alternative domain name suggestions that include at least one of (1) a backward bigram replacing a token at the beginning of the requested domain name or (2) a forward bigram replacing a token at the end of the requested domain name are ranked higher than other alternative domain name suggestions; and
outputting at least one of the at least one alternative domain name suggestion.

8. The method according to claim 7, wherein generating the plurality of alternative domain name suggestions further comprises:
for at least one token in the tokenized requested domain name, generating an alternative domain name suggestion by replacing the token with a corresponding token bigram.

9. The method according to claim 8, wherein generating the plurality of alternative domain name suggestions further comprises:
ranking the plurality of alternative domain name suggestions based on weights of the token bigrams replacing the tokens in the tokenized requested domain name.

10. The method according to claim 9, wherein the ranking further comprises ranking the plurality of alternative domain name suggestions based on a topical uniformity of tokens within each of the plurality of alternative domain name suggestions.

11. The method according to claim 9, further comprising:
verifying the availability of the domain name of each of the plurality of alternative domain name suggestions before outputting the plurality of alternative domain name suggestion; and
for each of the plurality of alternative domain name suggestions, if the domain name is not available, removing the domain name from the alternative domain name suggestions.

12. The method according to claim 7, wherein the token bigrams are retrieved from a bigram database generated by:
receiving a plurality of domain names from a domain name database;
tokenizing, by the processor, the plurality of domain names;
generating, by the processor, a plurality of token bigrams from the tokenized domain names;
filtering, by the processor, the plurality of token bigrams by token type, wherein the token type includes at least one of a forward bigram or a backward bigram;
ranking, by the processor, the plurality of token bigrams; and
storing, in a memory, the filtered and ranked token bigrams in the bigram database.

13. The method according to claim 12, wherein the requested domain name is added to the domain name database.

14. A system for suggesting alternative domain names, the system comprising:
a processor; and
a memory connected to the processor, the memory storing instructions to direct the processor to perform operations comprising:
receiving a requested domain name;
tokenizing the requested domain name to divide the requested domain name into a series of tokens;
retrieving token bigrams for tokens of the requested domain name;
generating a plurality of alternative domain name suggestions based on the token bigrams and the requested domain name;
ranking the plurality of alternative domain name suggestions, wherein the alternative domain name suggestions that include at least one of (1) a backward bigram replacing a token at the beginning of the requested domain name or (2) a forward bigram replacing a token at the end of the requested domain name are ranked higher than other alternative domain name suggestions; and
outputting at least one of the at least one alternative domain name suggestion.

15. The system according to claim 14, further comprising:
a user terminal, the requested domain name being received from the user terminal; and
a display that outputs the at least one of the at least one alternative domain name suggestion.

16. The system according to claim 14, wherein:
the generating at least one alternative domain name suggestion comprises:
for at least one token in the tokenized requested domain name, generating an alternative domain name suggestion by replacing the token with a corresponding token bigram; and
generating a plurality of alternative domain name suggestions; and
the operations further include ranking the plurality of alternative domain name suggestions based on weights of the token bigrams replacing the tokens in the tokenized requested domain name.

17. The system according to claim 14, wherein the token bigrams are retrieved from a bigram database generated by:

receiving a plurality of domain names from a domain name database;
tokenizing the plurality of domain names;
generating a plurality of token bigrams from the tokenized domain names;
filtering the plurality of token bigrams by token type, wherein the token type includes at least one of a forward bigram or a backward bigram;
ranking the plurality of token bigrams; and
storing the filtered and ranked token bigrams in the bigram database.

18. A non-transitory computer-readable storage medium storing instructions for suggesting alternative domain names, the instructions causing one or more computer processors to perform operations according to a method, the method comprising:
receiving a requested domain name;
tokenizing the requested domain name to divide the requested domain name into a series of tokens;
retrieving token bigrams for tokens of the requested domain name;
generating a plurality of alternative domain name suggestions based on the token bigrams and the requested domain name;
ranking the plurality of alternative domain name suggestions, wherein the alternative domain name suggestions that include at least one of (1) a backward bigram replacing a token at the beginning of the requested domain name or (2) a forward bigram replacing a token at the end of the requested domain name are ranked higher than other alternative domain name suggestions; and
outputting at least one of the at least one alternative domain name suggestion.

19. The storage medium according to claim 18, wherein:
the generating at least one alternative domain name suggestion comprises:
for at least one token in the tokenized requested domain name, generating an alternative domain name suggestion by replacing the token with a corresponding token bigram; and
generating a plurality of alternative domain name suggestions; and
the method further includes ranking the plurality of alternative domain name suggestions based on weights of the token bigrams replacing the tokens in the tokenized requested domain name.

20. The storage medium according to claim 18, wherein the token bigrams are retrieved from a bigram database generated by:
receiving a plurality of domain names from a domain name database;
tokenizing the plurality of domain names;
generating a plurality of token bigrams from the tokenized domain names;
filtering the plurality of token bigrams by token type, wherein the token type includes at least one of a forward bigram or a backward bigram;
ranking the plurality of token bigrams; and
storing the filtered and ranked token bigrams in the bigram database.

* * * * *